(12) United States Patent
Jeulin

(10) Patent No.: US 7,025,006 B2
(45) Date of Patent: Apr. 11, 2006

(54) INDUSTRIAL AND/OR HOUSEHOLD WASTE TREATMENT METHOD AND AN INDUSTRIAL AND/OR HOUSEHOLD WASTE TREATMENT INSTALLATION

(76) Inventor: Patrick Jeulin, 2 place des Nonnoins, 28260 Rouvres (FR)

( * ) Notice: Subject to any disclaimer, the term of this patent is extended or adjusted under 35 U.S.C. 154(b) by 9 days.

(21) Appl. No.: 10/472,638

(22) PCT Filed: Mar. 20, 2002

(86) PCT No.: PCT/FR02/00978

§ 371 (c)(1),
(2), (4) Date: Apr. 12, 2004

(87) PCT Pub. No.: WO02/075213

PCT Pub. Date: Sep. 26, 2002

(65) Prior Publication Data

US 2004/0168621 A1    Sep. 2, 2004

(30) Foreign Application Priority Data

Mar. 20, 2001 (FR) .................................. 01 03772

(51) Int. Cl.
*F23B 7/00* (2006.01)
*C10B 31/00* (2006.01)
*C10B 7/00* (2006.01)

(52) U.S. Cl. .................. 110/229; 110/341; 110/266; 110/246; 110/255; 202/117

(58) Field of Classification Search ............... 110/229, 110/230, 233, 234, 341, 266, 246, 242, 255; 202/113, 117

See application file for complete search history.

(56) References Cited

U.S. PATENT DOCUMENTS

| 4,895,083 A | * | 1/1990 | McDilda ................. 110/235 |
| 5,269,472 A | * | 12/1993 | Koenig ..................... 241/33 |
| 6,178,899 B1 | * | 1/2001 | Kaneko et al. ........... 110/346 |

FOREIGN PATENT DOCUMENTS

| DE | 198 46 805 | 4/2000 |
| EP | 0 505 278 | 10/1994 |
| EP | 0 724 008 | 1/1996 |
| EP | 1 002 767 | 5/1999 |
| EP | 0 692 677 | 9/1999 |
| FR | 510 495 | 12/1920 |
| FR | 971 510 | 1/1951 |
| FR | 976 074 | 3/1951 |
| FR | 0 736 845 | 7/1995 |

* cited by examiner

*Primary Examiner*—Kenneth Rinehart
(74) *Attorney, Agent, or Firm*—Perman & Green, LLP

(57) ABSTRACT

The invention relates to an industrial and/or household waste treatment method and to an industrial and/or household waste treatment installation (1). According to the invention, the method is characterised in that it consists of, in particular, the loading of the waste into numerous pierced containers (20), thermolysis of the waste in the containers (20) being conveyed into a pyrolysis oven (12); emptying of the containers (20) into a separation tank (18) in order to separate the products formed by the thermolysis; and treatment of the separated products.

32 Claims, 7 Drawing Sheets

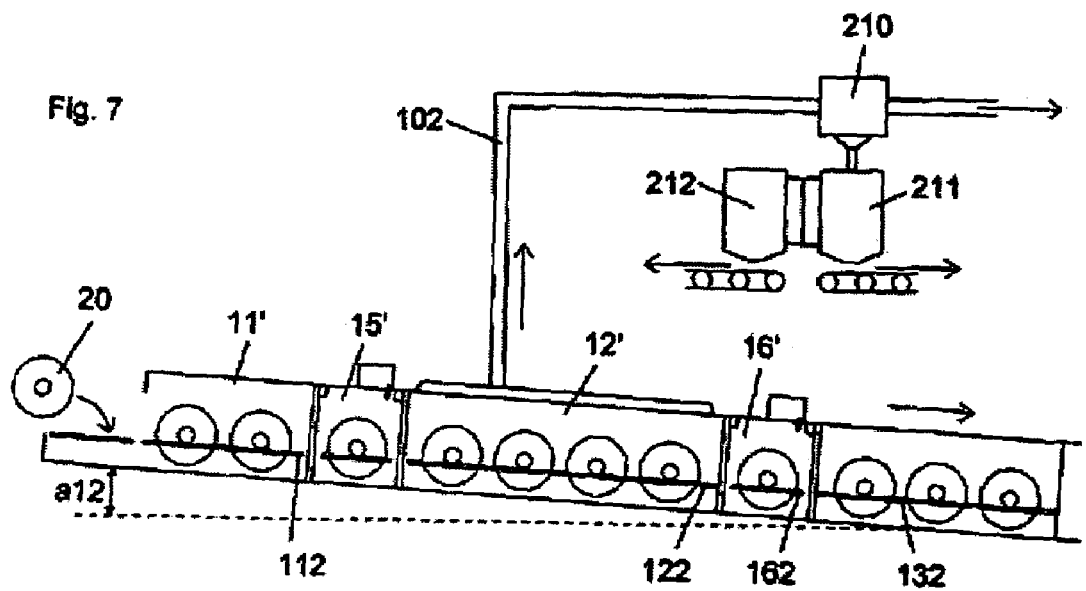
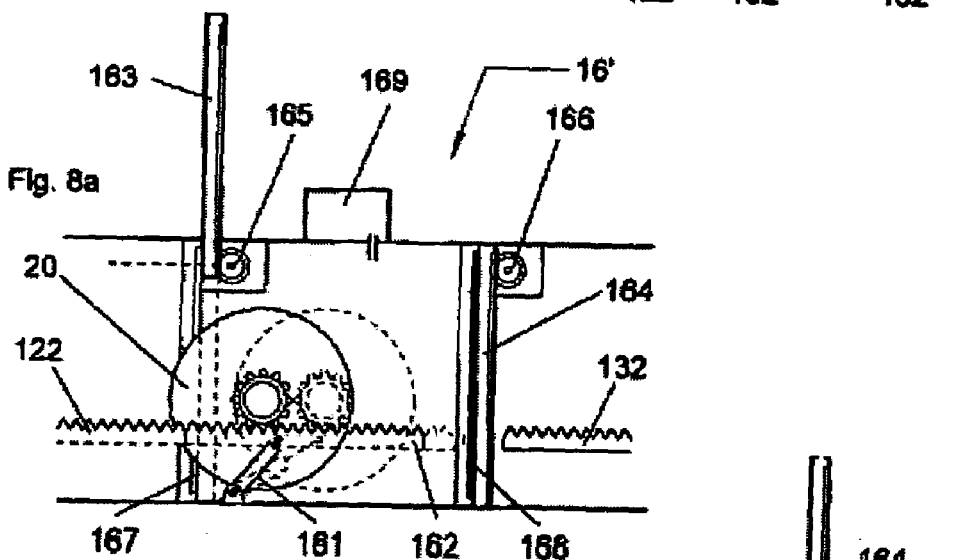
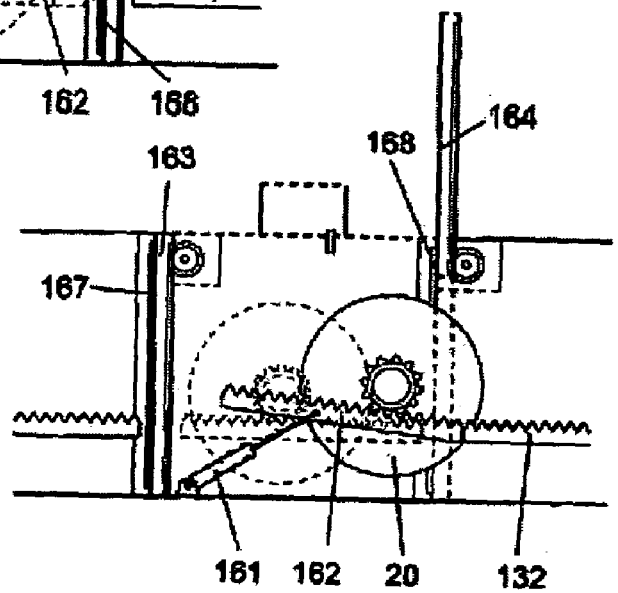

Key: Cendres = ashes

INDUSTRIAL AND/OR HOUSEHOLD WASTE TREATMENT METHOD AND AN INDUSTRIAL AND/OR HOUSEHOLD WASTE TREATMENT INSTALLATION

This application claims the benefit of the earlier filed International Application No. PCT/FR02/00978, International Filing Date, Mar. 20, 2002, which designated the United States of America, and which international application was published under PCT Article 21(2) as WO Publication No. WO 02/075213 A1.

The present invention concerns a treatment method for industrial and/or household waste. The invention also concerns a treatment plant for industrial and/or household waste.

Pyrolysis, by definition, consists of molecular dissociation in the absence of oxygen to principally form carbon-containing solids and pyrolysis gases. This reaction releases more energy than it consumes. The treatment is conducted on untreated waste without any polluting emission.

The pyrolysis products are:

finely pulverized charcoal;

sterile, chemically unreactive materials such as earth and debris reduced in volume and weight. Heavy metals are trapped in the matrices of the carbon-containing solids.

unoxidized iron; aluminum and glass that can be upgraded under the best conditions; the iron can be recycled in steel-working, the aluminum in foundry, copper in refining, and glass in glass-working.

A thermal treatment plant for waste is known from EP 692,677. According to this prior art, waste is treated by pyrolysis and the carbon-containing solids resulting from pyrolysis undergo purification. This prior art is characterized by the fact that the solid fuels obtained after purification are burned in a cyclone furnace, and the hot gases formed by this burning furnish an energy-recovery means. Pyrolysis, according to this prior art, is conducted by means of a rotating furnace surrounded by a jacket equipped with combustion means such as burners. The burners are supplied by a part of the pyrolysis gases resulting from pyrolysis. The waste is introduced directly into the furnace to be heated.

This plant of the prior art has major disadvantages. In fact, at the end of a certain operating time for a rotating furnace, waste introduced into the furnace forms a solid crust on the inner wall of the furnace. As a result, new waste introduced into the furnace is not directly in contact with the hot wall of the furnace and a greater quantity of heat must be consumed to treat it. In addition, at the end of a certain time, the hot waste in the furnace forms a twisted rope or braid structure due to the rotation of the furnace. This twisted rope structure can plug-up the evacuation lock, which can cause a fire inside the furnace after a certain period of time and thus damage it.

Moreover, pyrolysis plants are known, for example, from EP Patents 0 724,008, EP 0 610,120 or EP 0 505,278, which use open carriages or carriages on rollers to pass the waste into the pyrolysis furnace. In such carriages with simple translation, the waste is immobile during its passage into the furnace, and its variable shape or thickness can be the cause of an incomplete or poorly distributed pyrolysis. Such carriages on rollers also comprise moving parts whose functioning can be delicate due to the heat and soot that prevail in the furnace.

The object of the present invention is to alleviate these disadvantages of the prior art.

This object is attained by a treatment method for industrial and/or household waste according to claim 1, and a plant according to claim 15.

Another object of the invention is to propose a plant for the treatment of household and/or industrial waste that can use the method presented above.

This object is attained by a plant for the treatment of industrial and/or household waste according to claim 15.

In addition, according to the prior art described above, the quantity of carbon-containing solids formed by pyrolysis does not permit trapping the entire quantity of acidic gases or halogens produced during decomposition of certain waste such as plastic waste.

One object of the invention is to propose a pyrolysis method and plant permitting a reduction in the quantity of pollutants escaping with the pyrolysis gases.

This object is attained by a method according to claim 6, and a plant according to claim 23.

Moreover, when activated charcoal is used to filter or purify the polluting gases, particularly acidic gases or gases containing halogens, this charcoal itself becomes a harmful waste. Burning this charcoal would release these pollutants again, and therefore only postpones the pollution problem.

One object of the invention is to propose a method and a plant permitting the treatment of contaminated charcoal in order to extract the pollutants.

This object is attained by a method according to claim 11, and a plant according to claim 31.

Moreover, the carbon-containing solids obtained from the pyrolysis of waste after purification allows the continuing existence of ashes containing heavy metals, which may be toxic. In addition, the treatment of activated charcoal contaminated during the filtering of acidic gas leaves ashes containing various pollutants, such as halogens.

These ashes therefore constitute a harmful waste whose burial alone is an unsatisfactory solution.

One object of the invention is to propose a method and a plant permitting treating this waste so as to reduce these disadvantages.

This object is attained by a method according to claim 13, and a plant according to claim 32.

Additional developments of the invention are described in the dependent claims.

Plants for treatment of household and/or industrial waste are very often coupled to a heat engine operating a turbine to produce electricity. In the prior art, plants are commonly coupled to gas engines, to gas turbines, or to plants functioning according to the Rankine cycle. The integration of these machines is often costly and often not very profitable. For example, gas engines and gas turbines are internal combustion machines. Their use within the scope of energy upgrade of the pyrolysis gases produced in a pyrolysis treatment plant according to the invention assumes that the gas is washed beforehand in order to prevent any degradation of the components of the thermal engine. This necessary initial step is not integrated into the normal pyrolysis cycle and requires designing a means able to carry it out, which therefore increases the production cost.

One of the objects of the invention is thus to propose a treatment plant for industrial and/or household waste permitting a better recovery of the energy released during the pyrolysis cycle.

This object is attained by a plant according to claim 36.

The invention with its characteristics and advantages will appear more clearly upon reading the description made in reference to the attached drawings in which.

Figure 5:
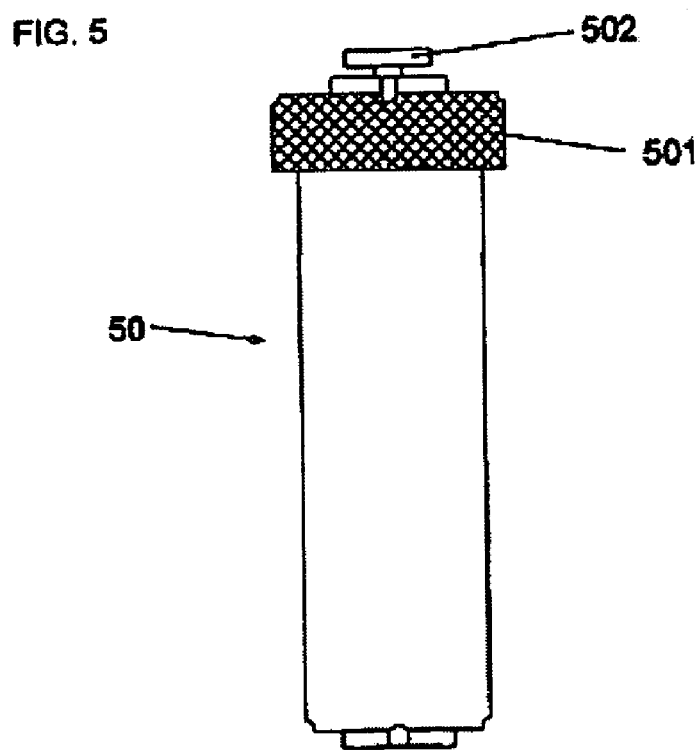
Figure 6:
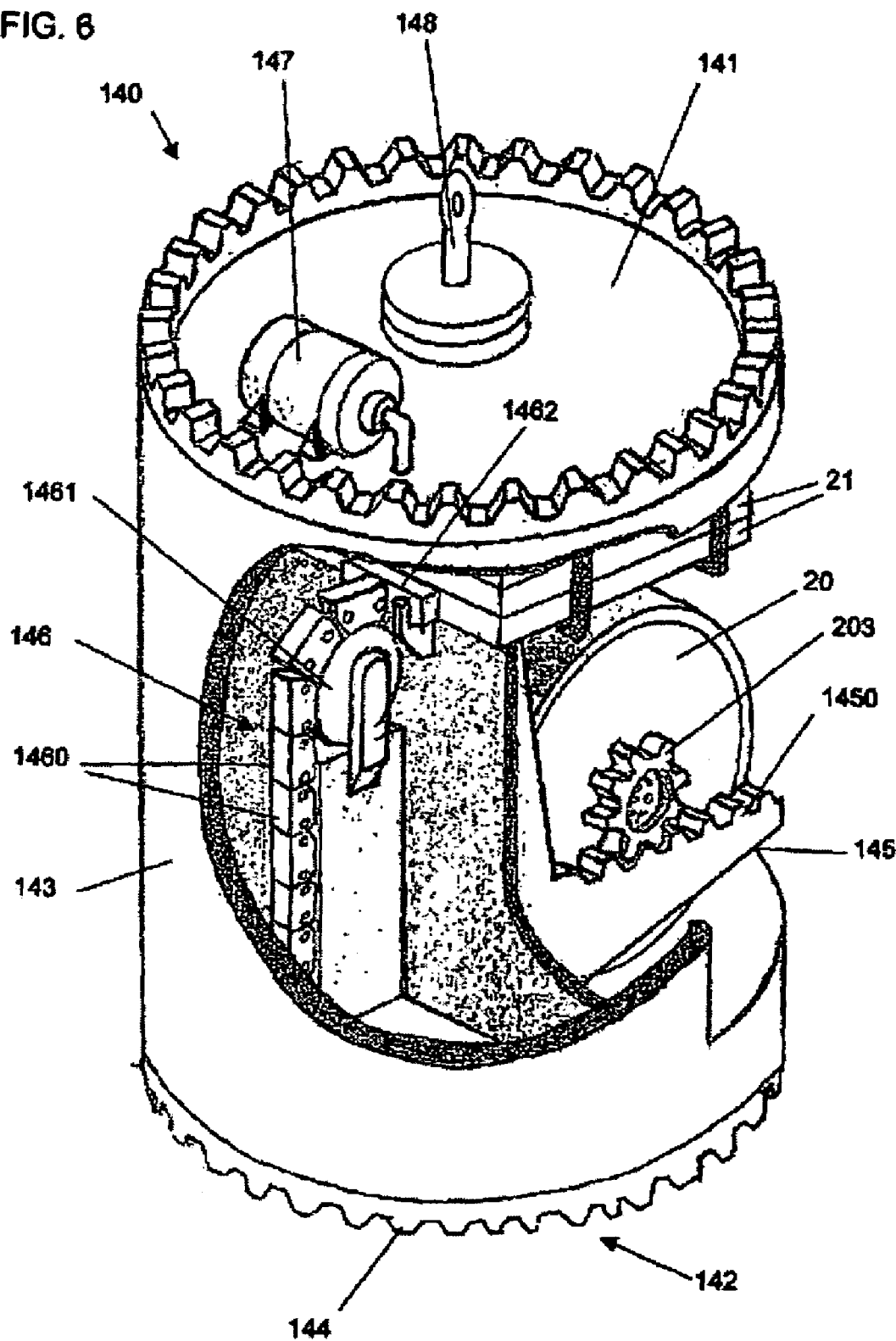
Figure 9:
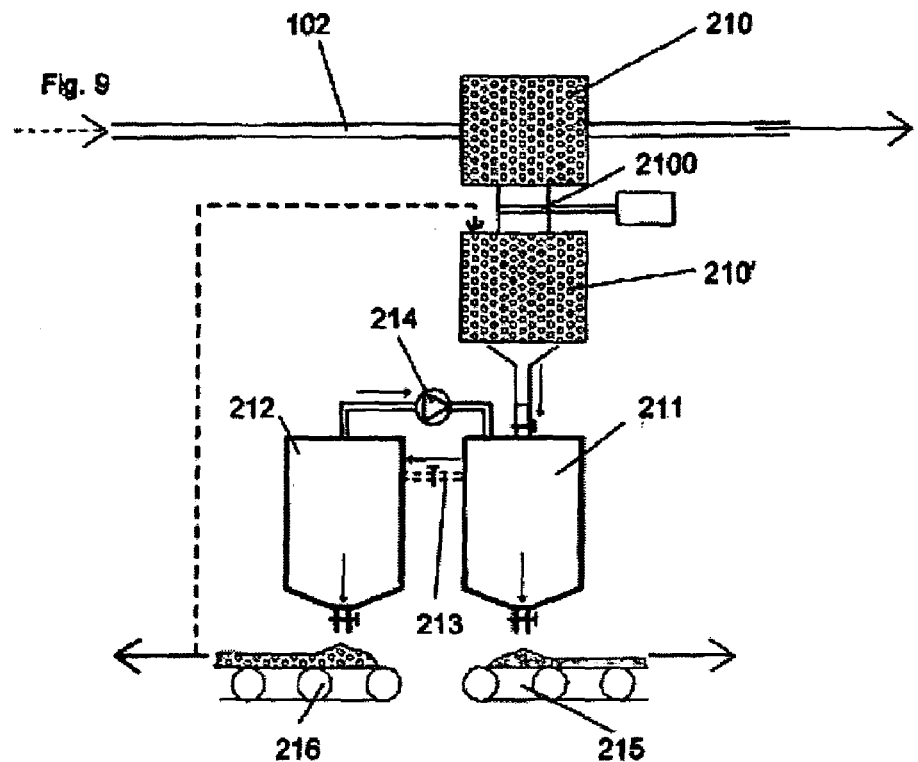
Figure 10A:
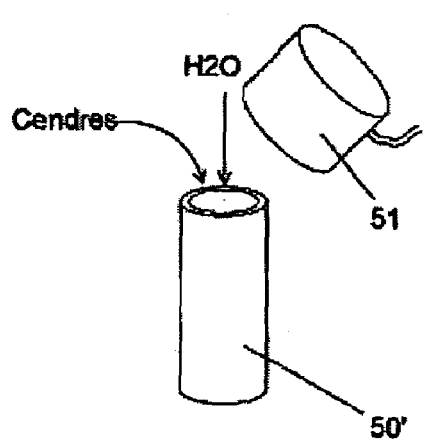
Figure 10B:
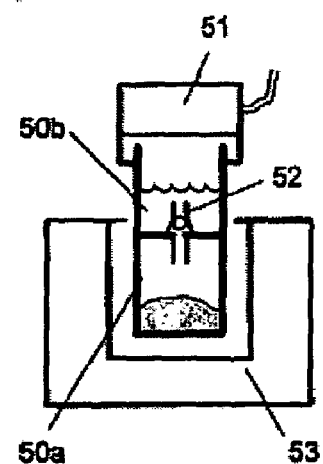

FIG. 5 shows a container serving for hydrothermal treatment according to the invention, FIG. 6 shows a hollow piston according to the invention, FIG. 7 shows a partial diagram of the plant according to one embodiment, with static filtering of the pyrolysis gases and where the tunnels are aligned and inclined, the containers moving by rolling along this slope, FIGS. 8a and 8b show a view in lateral section of the outlet lock of the pyrolysis tunnel, in one embodiment with guillotine doors, FIG. 9 shows a functioning diagram of the static filtering and separation process for pollutants retained during the filtering of pyrolysis gases, FIG. 10a shows an oxidation container in one embodiment having a high-pressure pump, FIG. 10b shows a schematic view in side section of an oxidation container during oxidation of ashes, in one embodiment having a high-pressure pump.

We will now describe the invention in conjunction with FIGS. 1 to 10.

The invention notably consists of a treatment by pyrolysis of untreated waste in a plant (1) for treatment of industrial and/or household waste.

Figure 1:
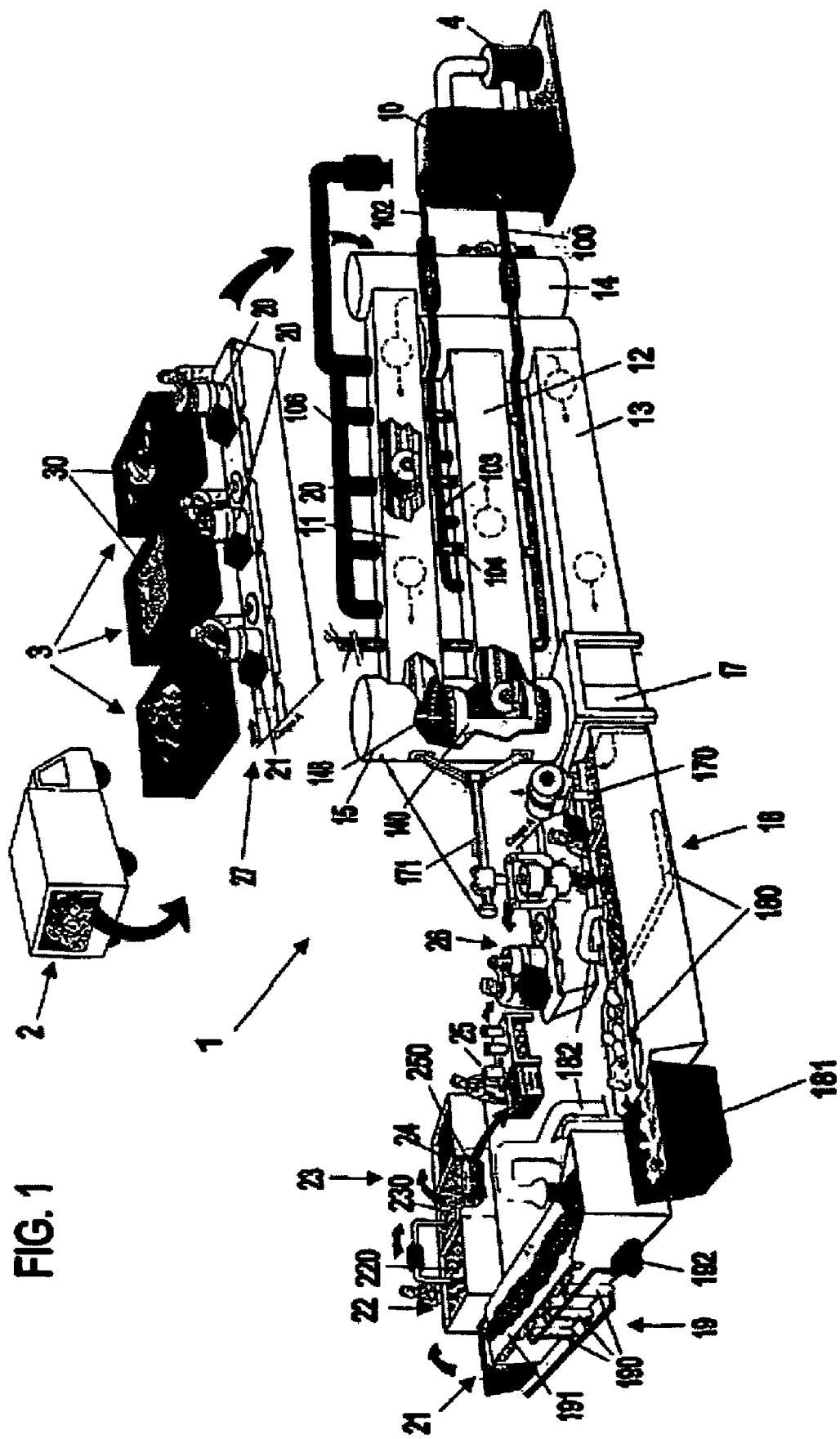
FIG. 1 shows the waste treatment plant according to the invention.

Waste (30) having arrived by truck (2) is stored in large capacity tubs (3) such as shown in FIG. 1.

First of all, waste (30) can undergo crushing, so as to break it into smaller pieces and to increase the ignitable surface. This crushing also permits homogenizing the waste.

Figure 3:
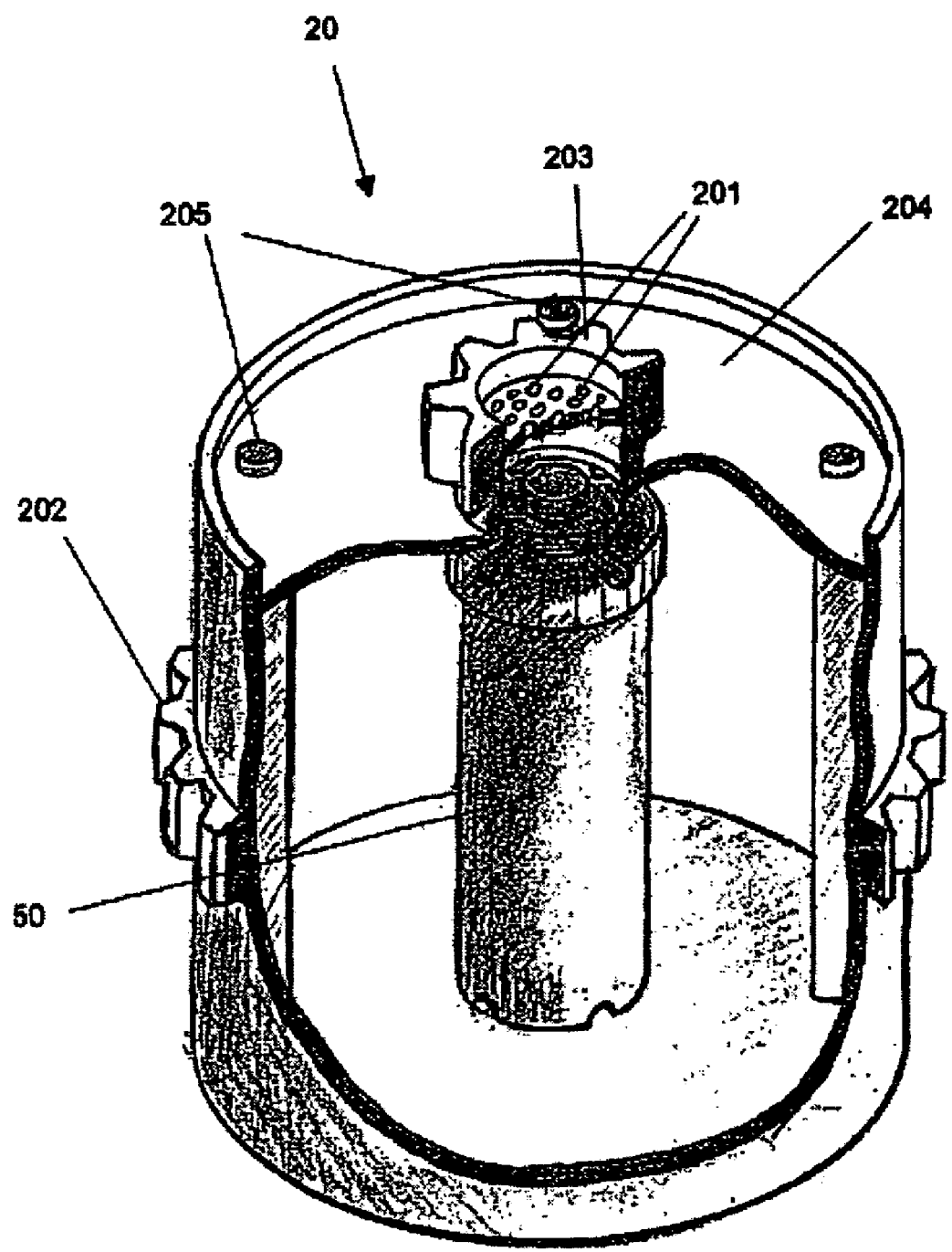
FIG. 3 shows a container according to the invention.

Waste (30), crushed or not, according to the invention, is placed in specific containers (20) at the level of a filling station (27). These containers (20) are made of refractory stainless steel. They are, for example, in the form of a revolving cylinder having, for example, a height of 800 mm and a diameter of 800 mm. Containers (20) have a diameter permitting them to receive in flat form a tire of conventional size not having undergone pretreatment. These containers (20), shown in FIG. 3, are pierced with holes (201) of 3-mm diameter to allow the gases from the thermal reaction to escape. These containers (20) have several toothed crown gears (202, 203) designed to cooperate with racks of plant (1) for treatment of waste (30). A first crown gear (202), called the upper crown gear, surrounds the lateral surface of container (20), roughly at the middle of its height. Two other crown gears (203), called end crown gears, for example, of diameters that are also less than the diameter of container (20) are each attached coaxially onto a base section (204) of container (20). Holes (201) pierced in containers (20) are, for example, made in the surfaces of base sections (204) of containers (20) and more particularly inside the zone defined by end crown gears (203).

Toothed crown gears (202, 203), by cooperating with the racks mounted in plant (1), assure the rotation of containers (20) in plant (1), in particular in pyrolysis furnace (12) permitting the pyrolysis reaction. These rotations are in fact necessary to promote the carbonization of all the layers of waste (30) to be decomposed.

The arrows of FIG. 1 symbolize the succession of waste treatment steps in plant (1) according to the invention.

According to the invention, plant (1) for treatment of industrial and/or household waste is made up in the following manner.

Figure 2:
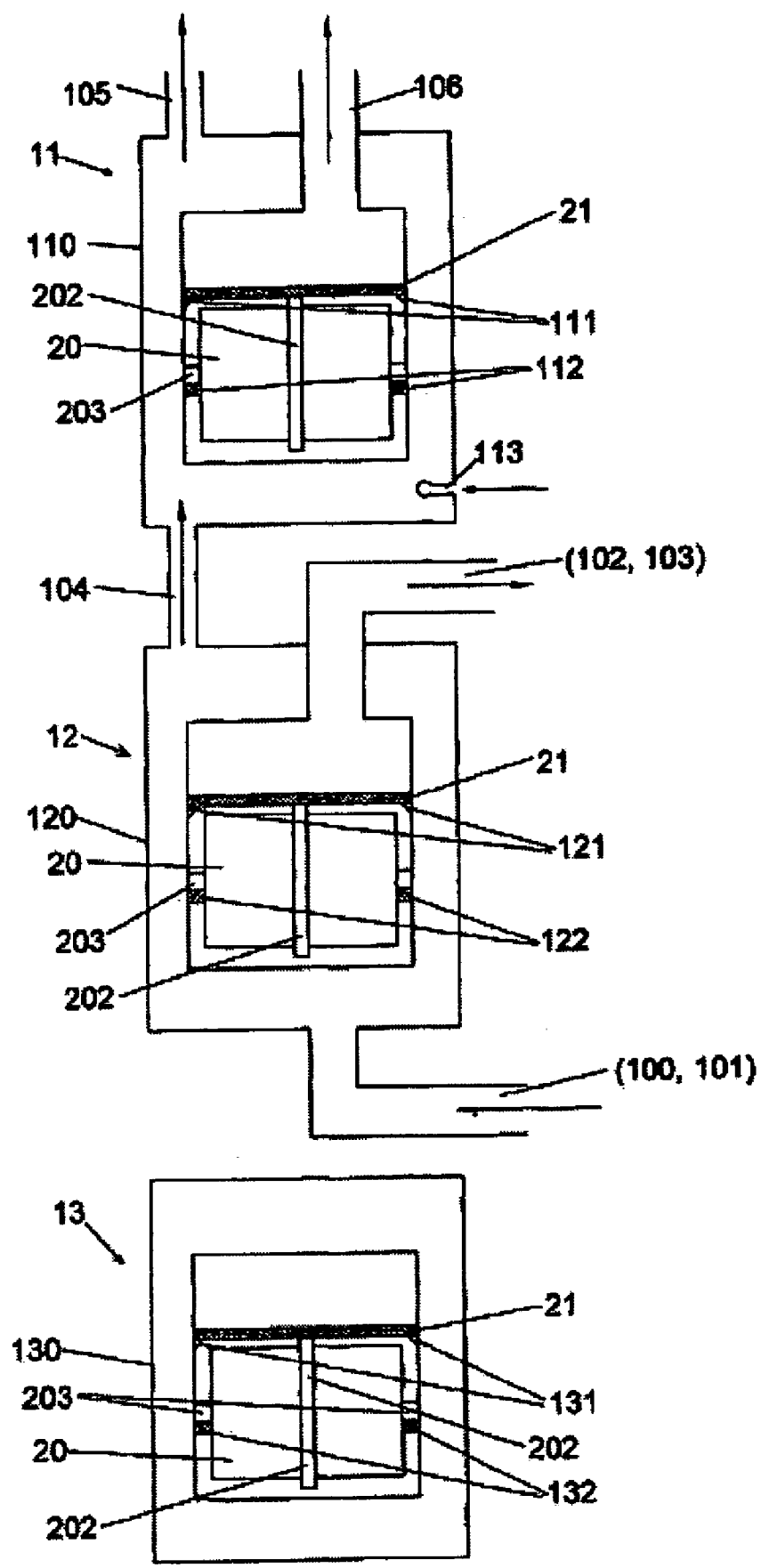
FIG. 2 shows, in cross section, the three superimposed tunnels.

Plant (1) according to the invention notably comprises three tunnels (11, 12, 13) superimposed and parallel to the ground. A first tunnel (11), situated at the top constitutes a dryer, a second (12), situated just below constitutes the pyrolysis furnace, and a third (13), lower still, is a dechlorination tank. Tunnels (11, 12, 13) have, for example, a roughly square cross section and have hollow shells (110, 120, 130), such as shown in FIG. 2, which allow passage of the heat created for the pyrolysis reaction. According to the invention, plant (1) also comprises three cylinders (14, 15, 16) each having a transport piston (140) for a container (20) for waste (30). These three cylinders (14, 15, 16) are arranged vertically and have openings communicating with the inlets or outlets of the tunnels to connect the different tunnels together. A first cylinder (14) is designed for the introduction of containers (20) into dryer (11) by translation of its piston (140) along its axis from an introduction station for containers (20) by an operator up to the inlet of dryer (11). A second cylinder (15) is positioned at the outlet of dryer (11) to receive the containers, piston (140) being translated toward the bottom after the containers are received to bring these containers (20) to the inlet of pyrolysis furnace (12). A third cylinder (16) is positioned at the outlet of pyrolysis furnace (12) to receive containers (20), its piston (140) being translated toward the bottom to bring them to the inlet of dechlorination tank (13). Each cylinder (14, 15, 16) therefore has a loading opening for containers (20) and an unloading opening for containers (20). First cylinder (14) has its loading opening situated at the bottom to introduce a container (20) and its unloading opening facing the inlet of tunnel (11) of the dryer. Second cylinder (15) has its loading opening facing the outlet of tunnel (11) of the dryer and its unloading opening facing the inlet of tunnel (12) of the pyrolysis furnace. Finally, the third cylinder (16) has its loading opening facing the outlet of tunnel (12) of the pyrolysis furnace and its unloading opening facing the inlet of tunnel (13) of the dechlorination tank.

Pistons (140) of cylinders (14, 15, 16) are hollow, as shown in FIG. 6. They are cylindrical in shape and comprise in a known manner an upper face (141), a lower face (142) and a lateral surface (143) positioned between the upper face and the lower face and defined by the surface facing the inner wall of cylinder (14, 15, 16). Their upper face (141) and lower face (142) are provided with teeth (144) forming a crown gear on each of these faces. This crown gear is designed to cooperate with means for moving piston (140) by rotation when the latter abuts against the top of cylinder (14, 15, 16) or against the bottom of the latter. Each piston (140) is activated in a continuous manner by a shaft (148), as shown in FIGS. 1 and 6. The pistons (140) of cylinders (14, 15, 16) have their lateral surface (143) partially open to allow, notably, a container (20) filled with waste (30) to enter. The solid part of lateral surface (143) is of a sufficient size to tightly seal the inlet or outlet of tunnel (11, 12, 13). Hollow piston (140) has a support (145) for receiving a container (20), comprising two rows (1450) of teeth directed towards the top and separated by a certain distance. In the upper part of this hollow piston (140) a certain number of metal elements are stacked, called motorization elements (21), comprising activated charcoal. The lowest of these stacked motorization elements (21) faces a push-chain system (146) situated inside hollow piston (140). This push-chain system (146) is designed to assure the introduction and the activation of motorization elements (21) containing activated charcoal in tunnels (11, 12, 13) on ramps (111, 121, 131) created in the upper part of each tunnel, as is shown in FIG. 2. Push-chain system (146) is made up of a chain with several links (1460) cooperating with a gearing (1461), which is activated, for example, by a motor, to induce the movement of the chain. The push-chain has a pushing means (1462) at one of its ends. This pushing means (1462) is positioned, in the rest position of the push-chain, supported against the lowest motorization element (21) of the stack of motorization elements (21). When the push-chain is activated, it pushes on ramp (111, 121, 131) by pushing means (1462) in a direction parallel to the axis of tunnel (11, 12, 13); this lowest motorization element (21) therefore pushes equally all the other motorization elements (21) already introduced onto ramp (111, 121, 131) of the considered tunnel (11, 12, 13). The push-chain then returns to its rest position and a new motorization element (21) from the stack is positioned facing pushing means (1462) of the push-chain and the cycle can start again. The introduction of a motorization element (21) onto ramp (111, 121, 131) of a tunnel (11, 12, 13), induces the unloading of a motorization element (21) into hollow piston (140) of hollow cylinder (14, 15, 16) situated at the tunnel outlet. Motorization elements (21) are elements of parallelepipid shape, for example, which occupy the entire width of tunnels (11, 12, 13) to be interposed between moving containers (20) and the evacuation conduits for the pyrolysis gases, in order to trap all the pollutants resulting from the pyrolysis reaction other than the pyrolysis gases. These motorization elements (21) are designed to assure the motor movement and the rotation of containers (20) for waste (30) in treatment plant (1). For this, they have teeth on their lower metal face forming a rack cooperating with the upper toothed crown gear (202) of containers (20) for waste (30) when they are joined on ramp (111, 121, 131). Motorization elements (21) are inserted into hollow piston (140) of first cylinder (14) by an operator and then delivered by push-chain system (146) into tunnel (11) of the dryer. They are then received in hollow piston (140) of second cylinder (15) to be delivered into tunnel (12) of the pyrolysis furnace. They are finally received in hollow piston (140) of the third cylinder (16) to be reintroduced into tunnel (13) of the dechlorination tank before being finally recovered at the outlet of the dechlorination tank to be reintroduced into the first cylinder (14). Approximately four motorization elements (21) must pass onto a container (20) to have it make a complete turn.

Activated charcoal is a somewhat powerful material permitting elimination of the organic matter contained in water. Activated charcoal is a very porous form of charcoal that is obtained by charring carbon-containing compounds with a high oxygen content, such as, for example, bituminous charcoal, lignite, wood, coconut shells, etc; in the absence of air. The adsorbent capacity of this charcoal is increased by eliminating the hydrocarbons that remain adsorbed in their pores, either by water vapor or by a mixture made up of water vapor and air. These materials are generally activated technically at approximately 800° C. and 1000° C., so as to create pores of several Angstroms diameter inside of which the compounds will be fixed. The activation can also be carried out chemically with a dehydrating agent at a temperature comprised between 400° C. and 600° C. Certain activated charcoals are even impregnated with metals or mineral salts in order to improve the absorption of pollutants. The size of the pores will be a function of the compounds that one wishes to eliminate. For example, small concentrations of micropollutants will be better eliminated on microporous charcoal, i.e., charcoal having pores smaller than 20 Angstroms.

Tunnels (11, 12, 13) have a roughly square section, for example. Tunnels (11, 12, 13) are stainless mechanically welded constructions. Inside these tunnels (11, 12, 13), in a roughly horizontal plane, are mounted two guiding racks (112, 122, 132), respectively attached onto the two opposite faces of the inner wall of tunnels (11, 12, 13). Each rack (112, 122, 132) has its teeth directed toward the top. In each tunnel (11, 12, 13), the two racks (112, 122, 132) are separated in the horizontal plane by a distance corresponding to the distance between the two end toothed crown gears (203) of one waste container (20). Thus, a container (20) is designed to be positioned horizontally along its axis of rotation, by its two end toothed crown gears (203) on the two guiding racks (112, 122, 132) for a tunnel (11, 12, 13). Guiding racks (112, 122, 132) also permit assuring the rigidity of the tunnels (11, 12, 13). When a piston (140) of a cylinder (14, 15, 16) is positioned at the inlet or outlet of a tunnel (11, 12, 13) to, respectively, unload a container (20) with waste (30) in tunnel (11, 12, 13) or load a container (20) with waste (30) having passed into tunnel (11, 12, 13), it is positioned in cylinder (14, 15, 16) so that its support (145) for container (20), comprising two rows of teeth (1450) separated by the same distance as that separating the two guiding racks (112, 122, 132), is found at the height of these two guiding racks (112, 122, 132) of tunnel (11, 12, 13). Thus, the platform extends the two racks (112, 122, 132) in order to unload its container (20) moved by motorization elements (21) on these racks (112, 122, 132) or to load a container (20) moved by motorization elements (21) in the direction of piston (140).

When container (20) is filled with waste (30) to be treated, the container is closed by its cover making up its upper face (204) supporting an end toothed crown gear (203). The cover is closed by a system of beta pins (205). Containers (20) filled with waste (30) and sealed are loaded into hollow piston (140) of the first cylinder (14) having its open part facing the loading opening of first cylinder (14). This loading can be done, for example, by an introduction device provided with an arm seizing containers (20), one by one, in a vertical position and comprising a means for turning containers (20) in order to place them in a horizontal position. Hollow piston (140) of this first cylinder (14), once filled with a waste container (20) and a certain number of motorization elements (21), for example five, goes back up into the cylinder and then pivots 180° in cylinder (14) to place its open lateral part opposite the entrance of tunnel (11) of the dryer.

At the outlet of dryer (11), container (20), moved by motorization elements (21), is introduced into hollow piston (140) of the second cylinder (15) while in a high position. Piston (140) then descends a sufficient distance to receive, for example, five motorization elements (21) with activated charcoal. Piston (140) then pivots 180° in its cylinder (15), thus blocking the outlet of dryer (11). Piston (140) of third cylinder (16) is then in position to block either the inlet of tunnel (13) of the dechlorination tank or the outlet of tunnel (12) of the pyrolysis furnace. A vacuum pump (147), for example, fixed onto the upper face (141) of piston (140), is then loaded in order to provide a vacuum for pyrolysis furnace (12) hermetically sealed by the position of pistons (140) of the second (15) and third (16) cylinders. Once vacuum is created, piston (140) of second cylinder (15) descends to be positioned in the axis of tunnel (12) of the pyrolysis furnace. Piston (140) then pivots 180° in cylinder

(15) to position its open lateral part facing the inlet of tunnel (12) of the pyrolysis furnace. Push-chain system (146) integrated with piston (140) is then activated to introduce motorization elements (21) moving container (20) contained in piston (140) into pyrolysis furnace (12), which is devoid of air. Piston (140) then again pivots 180° to go back up to its position in the axis of tunnel (11) of the dryer. It again pivots 180° and a new cycle, such as described above, can commence.

Tunnel (12) of the pyrolysis furnace, like tunnel (11) of the dryer, is a mechanically welded construction with a hollow shell (120). Contrary to the other tunnels (11, 13), tunnel (12) of the pyrolysis furnace is manufactured based on refractory stainless steel of the NS30 type which has characteristics and performances available that are guaranteed to be clearly greater than the maximal stresses imposed by the pyrolysis reaction. Tunnel (12) of the pyrolysis furnace has a fixed construction, without movable joints. It is made up of folded sheet metal, so as to constitute case constructions (not shown) of 1.5 m long assembled, the sheet metal having a thickness of 8 mm. The two cases of each end of the pyrolysis furnace are not heated, so as to be able to thermally control the loading and unloading zones for containers (20), respectively, at the inlet of pyrolysis furnace (12) and the outlet of pyrolysis furnace (12). Like tunnel (11) of the dryer, ramp (121) is designed to guide motorization elements (21) of containers (20) along tunnel (12), as is shown in FIG. 2.

The temperature maintained inside the pyrolysis furnace will be comprised between 400° C. and 500° C., this temperature being regulated to prevent possible accidents with oxygen.

As shown in FIG. 1, a gas incinerator (10) comprising burners is charged in order to create the heat necessary for the pyrolysis reaction. The heat introduced by the incinerator will be 850° C., so as to obtain a temperature comprised between 400° C. and 500° C. in the pyrolysis furnace (12). This incinerator (10) notably comprises an outlet made up of a first conduit (100) permitting carrying the heat produced towards pyrolysis furnace (12) and an inlet made up of a second conduit (102) designed to recover the gases escaping during the pyrolysis reaction of waste (30) contained in containers (20). First conduit (100) is divided into several parallel conduits (101) created in shell (120) of pyrolysis furnace (12), these conduits (101) connecting shell (120) of pyrolysis furnace (12) at several places along its length, so as to obtain the most uniform possible distribution of heat in the pyrolysis furnace (12). The second conduit (102) is likewise divided into several conduits (103) joining the inside of pyrolysis furnace (12) at several places to recover the pyrolysis gases escaping through the holes (201) pierced in containers (20) during the pyrolysis reaction of waste (30). The gases from the decomposition of waste (30) created by pyrolysis are therefore evacuated toward incinerator (10) through a plurality of conduits (102, 103), whose temperature is particularly controlled to prevent polluting gases from escaping. This evacuation is symbolized by the solid arrow in FIG. 2. This temperature must always remain comprised between 272° C. corresponding to the dew point of hydrocarbons, and 357° C. corresponding to the boiling point of mercury. The plurality of conduits (102, 103) will therefore be cooled or heated so as to remain in this temperature range in order to thus assure the condensation of mercury and to stay away from the dew point of hydrocarbons. The elements whose boiling points are less than 280° C. are the following:

fluorine, iodine, chlorine and bromine, i.e., the halogens. All these elements are therefore trapped in the activated charcoal of the motorization elements interposed between the pyrolysis-gas evacuation conduits and the waste containers. These compounds are also trapped in part by the activated charcoals formed by the pyrolysis reaction on the waste.

helium, neon, argon, krypton, xenon and radon are inert gases.

The remaining elements whose dew points are situated below the temperature range are hydrogen and oxygen, which combine with carbon to form the pyrolysis gases not trapped by the motorization elements containing activated charcoal and passing through conduits (103) parallel to second conduit (102). The pyrolysis gases are therefore made up of $H_2$ (dihydrogen) in an amount of 11%, $CH_4$ (methane) in an amount of 15%, CO (carbon monoxide) in an amount of 20%, $CO_2$ (carbon dioxide) in an amount of 30%, $C_2H_4$ (ethylene) in an amount of 6%, $C_2H_6$ (ethane) in an amount of 5%, and other hydrocarbons accompanied by water vapor in an amount of 13%.

The pyrolysis gases evacuated from pyrolysis furnace (12) towards incinerator (10) through second conduit (102) are therefore free of any pollutant and make up perfect fuel to be burned in incinerator (10) to form combustion gases. A portion of the combustion gases can supply heat to pyrolysis furnace (12) so as to maintain the pyrolysis reaction in pyrolysis furnace (12).

Another portion of the combustion gases obtained by combustion of a portion of the pyrolysis gases can be used to supply an energy recovery means, such as a Stirling engine (4), possibly Ericsson-modified, activating, for example, an alternator. The Ericsson-modified Stirling engine has the particular feature of having a very large yield. It also has the advantage of functioning according to an external combustion mechanism, i.e., the combustion of the fuel is not carried out inside the central mechanism of the engine. As a result, the risks of fouling [sooting] and of combustion irregularities due to the heterogeneous composition of the pyrolysis gases presents far fewer difficulties than for an external* combustion motor.

* sic; internal?—Trans. Note.

The creation of heat in incinerator (10), before recovery of the first gases from pyrolysis, is initiated by means of a fuel, such as, for example, propane. This fuel can also serve as a reserve fuel in the case where an insufficient quantity of pyrolysis gas is produced by the reaction.

Pyrolysis furnace (12) also comprises conduits (104) for evacuation of the heat predominating within its shell (120). These conduits (104) join shell (110) of dryer (11) placed just above pyrolysis furnace (12). This heat predominating in shell (110) of dryer (11) is directly reused to dry waste (30) before its introduction into pyrolysis furnace (12). In addition, the dryer comprises an air inlet (113) symbolized by the solid arrow in FIG. 2 and a conduit (105) for evacuation of heat toward the outside of tunnel (11) and a plurality of conduits (106) crossing through the shell to connect the inside of the dryer to the outside in order to permit evacuation of the water vapor formed by drying of waste (30) in containers (20) This, evacuation is symbolized in FIG. 2 by the solid arrow. This water vapor can, for example, be recovered to supply a tank by means of a condenser. The movement of heat is symbolized in FIG. 2 by the solid arrows.

Loading of containers (20) and the motorization elements into the third cylinder at the outlet of pyrolysis furnace (12)

is identical to loading at the outlet of dryer (11). However, the unloading of containers (20) and motorization elements (21) in the dechlorination tank situated just below pyrolysis furnace (12) has the particular feature of being made below the water level, so as to prevent any introduction of air.

The activated charcoal made up of carbon-containing solids formed by the pyrolysis reaction of the waste and contained in containers (20) and the activated charcoal comprised in motorization elements (21) that trapped the polluting gases are washed in dechlorination tank (13). This washing operation has for an objective to eliminate halogens, in particularly chlorine, from these compounds. Particular washing conditions are necessary in order to obtain a perfect separation of halogens from the activated charcoal. The washing operation consists of purifying the charcoal forming the motorization elements and the carbon-containing solids by producing chlorides, by combining, for example, the chlorine ions contaminating the activated charcoal with cations contained in the water of the dechlorination tank, such as $Na^+$ (sodium ion), $K^+$ (potassium ion), $Ca^{2+}$ (calcium ion), etc.

After washing in the dechlorination tank, containers (20) as well as motorization elements (21) are brought into a fourth cylinder (17) situated just below the second cylinder (15) and through which passes dechlorination tank (13). The containers and motorization elements are therefore always in water when they are in fourth cylinder (17). Containers (20) are then removed from fourth cylinder (17) and from the water by an arm (170), while motorization elements (21) are seized by an operator at the bottom of tank (13). Then, containers (20) are seized by another arm (171) that can be similar, for example, to the one used in the introduction device, and are placed in the vertical position. In this position, beta pins (205) are removed in order to remove the cover, these two elements being positioned on a conveyor belt bringing them towards station (27) for filling containers (20) with waste. Container (20) is still supported by the arm and its contents are emptied into a tank (18) adjacent to dechlorination tank (13) and extending the latter.

At this stage, the carbon-containing solids formed by pyrolysis of the waste float to the surface of tank (18), often with very small pieces of aluminum. These elements are pumped by means of a pump (182) in order to be introduced onto a band filter (19) equipped with ion-exchange resins (190). The remaining elements from the pyrolysis reaction, metals and minerals, are found at the bottom of tank (18). They are perfectly clean from the chemical point of view and very easily identifiable by using, for example, Foucault currents. They are not oxidized and are very easy to upgrade. In the bottom of tank (18), they fall onto a conveyor belt (180) permitting them to leave the tank and conveying them towards a recovery means such as a tub (181).

Band filter (19) is made up of a conveyor belt (191) pierced with very small holes through which a reduced pressure is created by means of a Venturi system (192), permitting introducing water filled with salt of carbon-containing solids onto ion-exchange resins (190). These resins (190) have acid and base groups in their molecular structure that are capable of respectively exchanging with metal ions and anions such as chlorides. These resins are treatable, which permits reusing the water carried away from the solid carbons.

After passage over band filter (19), the dried carbon-containing solids are finely crushed and sieved (21), so as to isolate possible inert elements that may still be present at this level of the treatment. The product that has thus become powdered is worked up in a tank (230) into a flotation (23) preceded by a stirring (22) in another adjacent tank (220), so as to separate the carbon-containing elements and the ashy elements. The carbon-containing elements will agglomerate on the surface of flotation tank (230) with a fatty substance such as, for example, filtered oil or oil from a vial that was already added during stirring in stirring tank (220). The ashy elements will naturally fall to the bottom of flotation tank (230). The carbon-containing elements recovered are then able to be reused in all types of thermal processes. In contrast, the ashy elements comprising heavy metals in particular are subjected to a special treatment.

Figure 4:
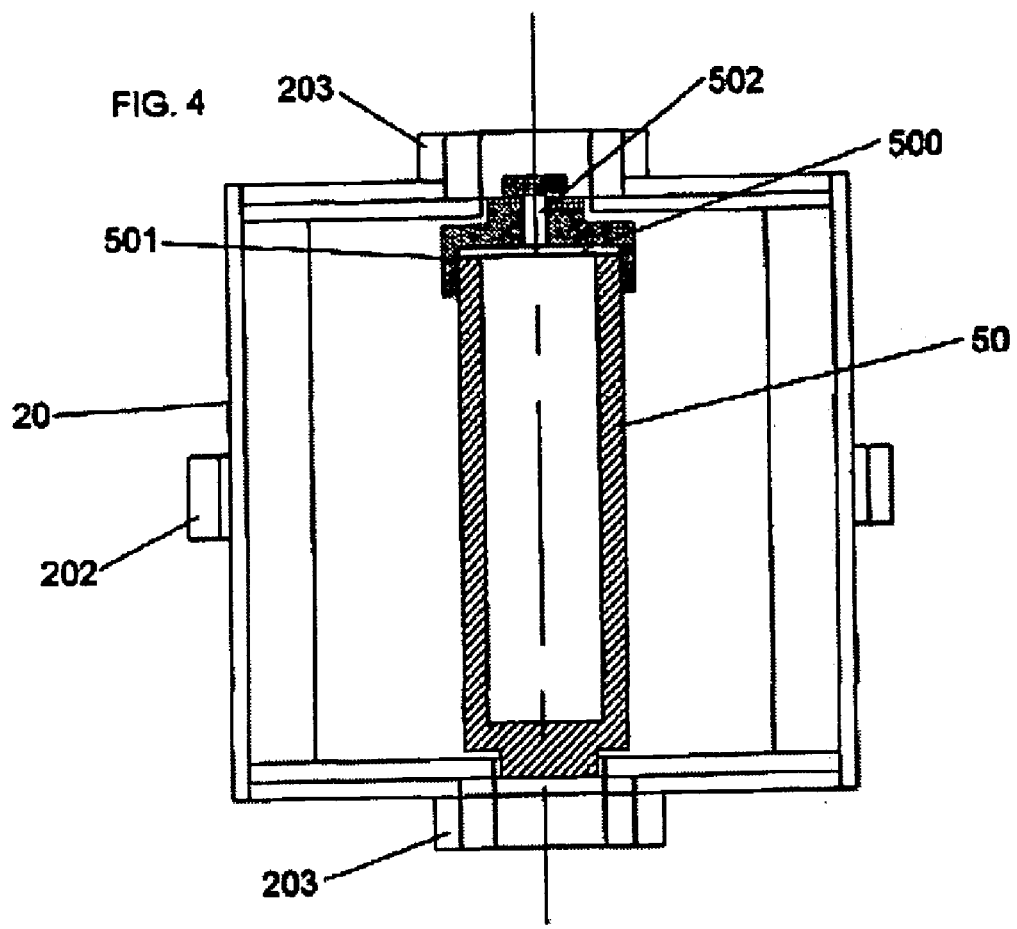
FIG. 4 shows the container according to the invention in longitudinal section.

This treatment consists of a hydrothermal treatment (25) permitting oxidizing the heavy metals. According to the invention, this treatment is conducted in specific containers (50) or oxidation containers, for example, of cylindrical form and shown in FIG. 5. These oxidation containers (50) are filled, for example, by an operator, with a small quantity of ashy material, the volume of container (50) being completed by a volume of water with or without the addition of an oxidant. A metal disk (500) is positioned to close container (50). A cover (501) is then screwed onto the threaded part formed on the outer lateral surface of container (50), so as to lock metal disk (500) by screwing. This cover (501) is threaded in its center over its entire thickness. A screw, called a pressure screw, with a screw body with a length greater than the thickness of the cover is screwed into this threading of cover (501) to come into contact with the face of metal disk (500) resting against cover (501) in a way so as to deform metal disk (500). This deformation very quickly induces an increase of pressure of the water in contact with the face of disk (500) opposite the face resting against cover (501). Container (50) has dimensions that allow it to be inserted into a waste container (20), for example, by being fixed coaxially onto waste container (20), as shown in FIG. 4. Container (50) has dimensions so that it can be inserted in the free space formed in the middle of a tire. Step (26) of introduction of this container (50) into waste container (20) takes place before step (27) of loading waste into waste container (20), as shown in FIG. 1. Once container (50) is inserted into waste container (20) and waste container (20) is filled with waste to be treated by pyrolysis, waste container (20) is closed again and introduced into treatment plant (1) according to the description presented above. Once it has arrived in pyrolysis furnace (12), the water contained in container (50) is heated until reaching and surpassing its supercritical point situated at a temperature of 374° C. and a pressure of 221 bars. Beyond this supercritical point, the hydrothermal reaction of the water is produced. This hydrothermal reaction is characterized by the fact that the water is oxidized and everything that it contains is oxidized as well, in particular, according to the invention, the ashy materials containing the heavy metals. Thus, after this hydrothermal treatment, there are only metal oxides, in other words, elements as they exist in the natural state in the form of ores.

(Supplement to the Description)

In the embodiment described below and shown in FIGS. 7 to 9, the heating gases from the pyrolysis tunnel are not used for heating the drying tunnel. It is clear, however, that this variant is also applicable to other embodiments. In addition, it is completely possible to provide a heated drying tunnel as described for the embodiments illustrated in FIGS. 1 to 6.

According to an embodiment illustrated in FIGS. 7 to 8b, the different treatment steps being applied to the waste in containers (20) are conducted during conveyance of these containers into tunnels (11', 12', 13') situated roughly on the same level.

Pyrolysis tunnel (12') is then supplied with containers (20) by a portion of the tunnel having two doors forming an inlet lock (15') upstream and two other doors forming an outlet lock (16') downstream. These doors, for example, can be guillotine doors (163, 164), moved between an open position and a closed position by translation in a plane roughly perpendicular to the direction of conveyance of the containers. These doors are moved by activating means, for example, a motor driving a toothed-gear pinion (165, 166) acting on a rack in one piece with door (163, 164, respectively) and positioned in the plane of its movement. In order to permit maintenance of reduced pressure in the pyrolysis zone, a seal can be assured by sealing means positioned on the periphery of the door. These sealing means comprise, for example, one or more inflatable gaskets (167, 168) able to resist the pressures and temperatures present in this zone. By way of example, such an inflatable gasket can be provided to maintain a seal of up to approximately 6 bars, and resist temperatures of the order of 250° C. for a relatively long time.

In this embodiment, one or more tunnels are arranged according to a slope forming an angle (a12) with the ground, and the containers (20) move inside these tunnels by rolling under the effect of gravity. In this case, this rolling does not use motorization elements (21) as described above and the containers cannot have a large toothed crown gear (202) on their periphery. The containers are supported and guided by end crown gears (203), which can be provided with teeth and roll on lateral racks (112, 122, 132) or racks attached along the course of conveyance of the containers, in particular along the inner walls of the tunnels. These racks can comprise moving parts along all or part of their length. These moving parts can be activated by mobilization means, for example hydraulic or pneumatic jacks, so as to start or restart the movement of the containers, or permit leaving free certain parts that lack racks, in particular for passage of a door.

In order to start or restart the movement of a container (20) situated in a given area of the conveyance course, a moving part (162) of the rack is inclined in a more accentuated manner by rotation around a roughly horizontal axis under the effect of a jack (161), which triggers or accelerates the movement of the container resting on this same moving part. Such a triggering is illustrated in FIGS. 8a and 8b, for a portion of the conveyance course situated inside a lock, for example outlet lock (16') of pyrolysis tunnel (12').

When a container arrives at the end of the pyrolysis zone, a vacuum pump (169) brings lock (16') to a pressure close to that inside the pyrolysis tunnel. Then, gasket (167) of door (163) upstream of pyrolysis outlet lock (16') is deflated and the door opens by a translation toward the top. Under the effect of a jack (161) associated with guiding means (not shown), a portion of the rack, called the lock rack (162) is displaced to assure continuity with rack (122) attached for support and guiding of pyrolysis tunnel (12'). The closest container (20) can then roll on these two abutted racks to enter into lock (16') as illustrated in FIG. 8a. Once the container is inside the lock, lock rack (162) is brought inside the space situated between the two doors. Upstream door (163) or the inlet door is then closed again and sealed by inflating its gasket (167).

Once lock (16') is sealed on the upstream side, gasket (168) of downstream or outlet door (164) deflates and this door opens by translation towards the top. By action of jack (161) associated with guiding means (not shown), lock rack (162) is then moved by translation until a continuity is assured with rack (132) attached for support and guidance of outlet or cooling tunnel (13'). Lock rack (162) is then inclined along a roughly horizontal axis to raise its upstream part and trigger the rolling of container (20) from the inside of the lock to outlet tunnel (13'). Once container (20) leaves lock (16'), downstream door (164) of the lock closes, its gasket (167) reinflates, and the lock is ready to receive another container originating from the pyrolysis tunnel.

In the same way, pyrolysis tunnel (12') receives containers to be treated through an inlet lock (15') operating according to the same principle.

The use of such locks with retractable doors and moving racks permits in particular decreasing the complexity of the devices necessary to pass the containers between the outer space and the hot and depressurized space of the pyrolysis tunnel, or between the latter and the outlet tunnel or the dechlorination tank.

The use of inclined tunnels or conveyance routes possibly matched with moving racks, permits simplifying the mobilization means used to move the containers, and simplifying the structure of the containers.

In this embodiment, the pyrolysis gases coming from pyrolysis tunnel (12) are filtered in at least one static filter (210) using, for example, activated charcoal to capture the undesirable elements that they contain. As shown in FIG. 9, the gases from pyrolysis of the waste that are carried by one or more conduits (102) are then passed through a filter (210) comprising filtering elements based on activated charcoal. This filter is mounted on a turret (2100) or a carrousel and can be easily replaced by another (210') when its filtering elements are saturated. After a filter has been positioned and the pyrolysis gases have been purified, the saturated filter is emptied of its charcoal in a dissolution chamber (211). This dissolution chamber is then filled with a washing fluid, for example a gaseous mixture comprising carbon dioxide ($CO_2$). Pumping means (214) then bring this washing fluid to conditions of temperature and pressure sufficient for at least a part of the $CO_2$ to be found in the supercritical state, i.e., above its "triple point". In the case of carbon dioxide, this supercritical state is obtained when the temperature is higher than 31° C. and the pressure greater than 73 bars.

In this supercritical state, the carbon dioxide is able to dissolve solid or powdered charcoal originating from the filtering of the pyrolysis gases. Ashes then exist in the dissolution chamber and these contain the elements initially contained in the pyrolysis gases filtered by the activated characoal.

Once the charcoal has been dissolved by the carbon dioxide, dissolution chamber (211) is made to communicate with an expansion chamber (212) by communication means, for example, a valve (213). The pressure inside this expansion chamber (212) is then relaxed, which induces a redeposition of previously dissolved charcoal. The carbon dioxide is then reused by pump means for another washing cycle, and the charcoal is evacuated by evacuation means (216). This charcoal is therefore free of the pollutants that it had accumulated during filtering of the pyrolysis gases, and can be reused without danger. It can be reactived for reuse in a filtering cycle, or upgraded to the form of fuel.

After evacuation of the supercritical carbon dioxide from dissolution chamber (211) towards the expansion chamber, the polluting elements present in the dissolution chamber are evacuated by evacuation means (215), for example, in order to be treated by a hydrothermal treatment in the same way as the ash and heavy metals from the carbon-containing solids originating from pyrolysis.

By this process of washing the gas-filtering charcoal, it is possible to dispose of these pyrolysis gases or to upgrade them as a fuel that does not contain untreated polluting elements.

In an embodiment shown in FIGS. 10*a* and 10*b*, the hydrothermal treatment method for these ashes is performed separately from the passage of waste containers (20) into pyrolysis tunnel (12, 12'). This embodiment can be applied to ashes from carbon-containing solids remaining in containers (20) after pyrolysis, such as ashes originating from washing the charcoal used for purification of the pyrolysis gases. It is clear that this variant of the ash treatment method can be completely combined with the other embodiments described here.

In this embodiment, the ashes to be treated are enclosed in a liquid, for example, water, possibly with the addition of an oxidant, in an oxidation container (50'). This oxidation container is then brought to high pressure by pressurizing means, for example, a high-pressure pump (51) attached on the opening of the container. The inside of the oxidation container is separated into a first part, or hot part (50*a*), and an second part, or cold part (50*b*). This first part (50*a*), or hot part, receives the ashes and is situated in a region of container (50') far from pump (51). This hot part can be kept under pressure once the pump is deactivated or removed, for example, by an antireturn valve permitting the entrance of water into this part, then keeping the water under pressure and preventing it from leaving.

Once the ash and water mixture is placed under pressure in first part (50*a*), the pressure is relaxed in the second part (50*b*). The container is then heated by heating means (53), principally or only in its first part (50*a*) containing the ashes.

During these operations, the pressure and the temperature applied in first part (50*a*) of oxidation container (50') are chosen so that the water is found in a supercritical state. These conditions are chosen in particular so that the temperature is higher than 374° C. and the pressure is greater than 250 bars.

In the supercritical state, the water is able to oxidize the pollutants contained in the ashes, especially heavy metals. After this treatment, the pollutants contained in the ashes are therefore in the state of oxides, the form in which they exist in nature.

Due to the oxidation capacity of water in the supercritical state, the walls of the container and the mechanisms that it contains are also susceptible to rapid oxidation and deterioration. The method described here therefore has the advantage of confining this oxidation only to the first part (50*a*) of oxidation container (50'). For reasons of cost or maintenance, this first part can be provided with a leak-proof inner lining, for example. Likewise, complex and fragile elements such as the high-pressure pump will not deteriorate, since the water only reaches the supercritical state in the second part (50*b*). In fact, the pressure in the second part (50*b*) is already lowered below the triple point threshold when the oxidation container is heated. This separation into two parts of different pressures thus permits precisely determining the region in which the water reaches its supercritical state.

(End of Supplement)

Thus, the invention proposes a treatment method for industrial and/or household waste, characterized in that it notably comprises a loading of waste into a plurality of pierced containers, a pyrolysis of the waste in containers (20) and conveyance into a pyrolysis furnace (12) and one or more treatments of the products resulting from this pyrolysis, the pierced containers having at least one part (203) of a shape permitting these containers to roll on themselves in the pyrolysis furnace, thus producing the movement and turning of the containers by gravity of their contents.

According to a particular feature, the method comprises a drying of waste (30) in containers (20) before pyrolysis by conveyance into a dryer (11) heated by the residual heat from the means used to heat the pyrolysis furnace.

According to a particular feature, the method comprises a recycling of a part of the gases issued from the pyrolysis as a fuel, to obtain the heat necessary for pyrolysis or to supply at least one energy-recovery means (4), or both.

According to a particular feature, the pyrolysis gases are evacuated into evacuation conduits (102, 103) whose temperature is particularly controlled by heating or cooling of the conduits, so as to prevent the escape of polluting gases.

According to a particular feature, this temperature in evacuation conduits (102, 103) is kept between 272° C. and 357° C.

According to a particular feature, the gases issued from the pyrolysis lose a part of the pollutants that they contain upon contact with filtering elements or absorbent elements containing activated charcoal, positioned along their trajectory in the pyrolysis furnace, or in filtering means arranged after the outlet of the gases from this furnace, or both.

According to a particular point, the filtering elements comprise motorization elements (21) containing activated charcoal and assuring the rotation of waste containers (20) by a rack system.

According to a particular feature, the method comprises a washing of the carbon-containing solids from pyrolysis of waste contained in containers (20) after pyrolysis, or from the activated charcoal of motorization elements (21), or both, this washing being conducted by passage into a liquid tank (13).

According to a particular point, a treatment of the waste after pyrolysis comprises the following steps:
  separation by gravity in a tank (18) for separation of carbon-containing solids, on the one hand, and metals, minerals or metal oxides, on the other hand;
  pumping of the carbon-containing solids into separation tank (18);
  filtering of these carbon-containing solids on a band filter (19) to introduce the water onto ion-exchange resins (190).

According to a particular feature, the method comprises a treatment of the dried carbon-containing solids resulting from the pyrolysis, or of activated charcoal after filtering of the pyrolysis gases, or both, this treatment comprising the following steps:
  crushing (21) and possibly sieving the carbon-containing solids;
  stirring (22), then flotation (23), of the crushed carbon-containing solids in a liquid tank (230), so as to create a surface agglomeration of the carbon elements with a fatty element, on the one hand, and at the bottom of the tank, ashes containing heavy metals, on the other hand.

According to a particular feature, activated charcoal (210, 210') polluted by filtering of the pyrolysis gases, or carbon-containing solids resulting from pyrolysis, or a combination of these elements are treated according to a process of separation by supercritical gas comprising the following steps:
  confinement of the elements to be treated in a dissolution chamber (211) with a separation gas;

bringing to temperature and pressure of dissolution chamber (211) in such a way that the separation gas passes into the supercritical state, bringing about a dissolution of the charcoal present in the elements to be treated and a deposition in the form of ashes of the pollutants that it contains;

evacuation of the supercritical separation gas and the dissolved charcoal that it contains outside dissolution chamber (211);

expansion of the separation gas at conditions below those for the supercritical state and deposition in the solid form of the charcoal that it contains.

According to a particular feature, the separation gas used comprises carbon dioxide, dissolution chamber (211) being brought to a pressure greater than 73 bars and a temperature higher than 31° C.

According to a particular point, after flotation (23) or separation (211) by supercritical gas, the treatment of the ashes containing the pollutants or the heavy metals comprises a hydrothermal treatment by a liquid in the supercritical state able to oxidize these metals or degrade these pollutants.

According to a particular feature, the hydrothermal treatment of the ashes containing the pollutants or the heavy metals comprises the following steps:

mixing of the ashes to be treated with water in an oxidation container (50, 50');

raising the pressure above 221 bars and raising the temperature above 374° C. of the contents of this oxidation container (50, 50'), so that the water passes to the supercritical state.

The invention also proposes a plant (1) for treatment of industrial and/or household waste, characterized in that it comprises a pyrolysis furnace (12, 12') comprising means for conveying pierced containers (20) containing waste (30) to be treated, separation means to separate the products formed in containers (20) by pyrolysis and treatment means for these separated products, the containers comprising at least one part (203) having a form permitting these containers to roll on themselves in the pyrolysis furnace, thus bringing about the movement of these containers and the turning by gravity of their contents.

According to a particular feature, the pyrolysis furnace comprises a tunnel (12'), kept at reduced pressure by pumping means and through which containers (20) containing the waste are conveyed, this tunnel comprising at each of its ends a part called the inlet lock (15') and a part called the outlet lock (16') able to receive at least one container (20) between two doors (163, 164) endowed with sealing means and thus able to admit this container into pyrolysis tunnel (12') or to extract it without placing in direct communication the inside of the tunnel and the outside atmosphere.

According to a particular feature, at least one door (163, 164) of at least one lock (15', 16)' of pyrolysis tunnel (12') opens or closes according to a transverse translational movement at the axis of this tunnel, under the effect of at least one activator (165, 166) and can be sealed, once shut, by gaskets (167, 168) comprising at least one inflatable part that can be pressed against a part of this door.

According to a particular feature, a container (20) receiving the waste is hollow and of rotating cylindrical shape and comprises two toothed crown gears (203) surrounding its axis and situated at both ends of container (20), and holes (201) pierced in the base sections of container (20).

According to a particular feature, the conveyance means for pyrolysis furnace (12, 12') comprises a system of attached racks (112, 122, 132) called rolling racks, with which end toothed crown gears (203) of containers (20) cooperate to hold and guide containers (20) during movement.

According to a particular feature, at least a portion of rolling racks (112, 122, 132) has a slope with regard to the ground of an angle greater than a given angle (a12), this slope permitting facilitating or prolonging the rolling of containers in pyrolysis tunnel (12').

According to a particular feature, rolling racks (112, 122, 132) have at least one moving part (162) by translation along the direction of rolling, or by rotation around a horizontal axis perpendicular to the direction of rolling, or a combination of these movements, this moving part being activated by mobilization means (161) permitting displacing moving part (162) so as to either assure the continuity of rolling in a given region, or to increase the slope of the rack and trigger or maintain the rolling movement of at least one container, or both.

According to a particular feature, the conveyance means comprises a rack system comprising a plurality of motorization elements (21) moved by activation means, placed above containers (20) in horizontal position and assuring the rotational movement of the containers by cooperating with a first toothed crown gear (202) positioned on the outer surface of containers (20) and around their axis.

According to a particular feature, the plant comprises filtering or absorption means for the pollutants contained in the gases emitted from the pyrolysis, these filtering or absorption means comprising elements containing activated charcoal, positioned along the trajectory of these gases in the pyrolysis furnace, or in filtering means positioned after the gases leave this furnace, or both.

According to a particular feature, in pyrolysis furnace (12), the filtering or absorption means comprise activated charcoal, contained in motorization elements (21) and interposed between containers (20) for waste (30), on one side, and conduits (102, 103) forming recovery means for the pyrolysis gases, on the other side.

According to a particular point, the plant comprises means for washing the waste contained in the containers during conveyance or the activated charcoal that has filtered the pyrolysis gases, these washing means being situated downstream of the pyrolysis furnace and made up of a tank (13) for washing by immersion.

According to a particular feature, the plant comprises means for recovery of the pyrolysis gases formed by pyrolysis of waste in pierced containers (20), and either means for combustion of a portion of the pyrolysis gases to supply the pyrolysis furnace with heat, or means for recovery of a portion of the pyrolysis gases, whose combustion is used by the combustion means to supply an energy recovery means (4), or a combination of these elements.

According to a particular feature, the plant comprises recovery means for the heat used for pyrolysis, these recovery means supplying a dryer (11) designed to dry waste (30) during conveyance in containers (20) by the conveyance means, this dryer (11) being situated upstream of pyrolysis furnace (12) and, on the one hand, comprising means for recovery of the water vapor formed by drying of the waste and, on the other hand, means for evacuation of the heat.

According to a particular feature, tank (13), pyrolysis furnace (12) and dryer (11) are made up of three tunnels (11, 12, 13) with superimposed hollow shells (110, 120, 130) in which containers (20) are conveyed, the introduction of containers (20) into dryer (11), the passage of the contents of dryer (11) to pyrolysis furnace (12) and the passage from pyrolysis furnace (12) to tank (13), carried out in each of these positions by a cylinder (14, 15, 16) positioned vertically along its axis of revolution and having a piston (140) that can move by translation and by rotation in cylinder (14, 15, 16) along the axis of cylinder (14, 15, 16), this piston (140) being hollow and partially open on its surface facing the inner wall of cylinder (14, 15, 16), the opening on piston (140) having dimensions so as to be able to receive a waste container (20) at the outlet of a tunnel (11, 12, 13) or during the introduction of container (20) in plant (1) and so that the solid part of the piston surface can tightly block the inlet or outlet of tunnels (11, 12, 13) so as to be able to create the vacuum necessary for the pyrolysis reaction by means of a vacuum pump (147) in pyrolysis furnace (12).

According to a particular feature, after washing, the containers are emptied into a separation tank (18) to separate the products contained in containers (20) having undergone pyrolysis, a part of the products constituting carbon-containing solids being found on the surface of tank (18) and another part constituting metals or minerals being found at the bottom of tank (18) on a conveyer belt (180) raising the minerals towards the outside of tank (18) to bring them to a recovery station (181).

According to a particular feature, a pump (182), connected between tank (18) and a filter (19), pumps the carbon-containing solids to introduce them onto a band filter (19) pierced with small holes, a Venturi system creating a reduced pressure through the holes of filter (19) so as to bring the water filled with carbon-containing solids onto ion-exchange resins (190).

According to a particular feature, the plant comprises at least one dissolution chamber (211) able to receive activated charcoal (210, 210') polluted by filtering of the pyrolysis gases, or carbon-containing solids from pyrolysis, or a combination of these elements, and can be filled with a mixture based on carbon dioxide, and comprising pumping means (214) able to bring the carbon dioxide in the chamber to its supercritical state so as to dissolve the solid carbon present in the chamber, then to evacuate this supercritical carbon dioxide towards an expansion chamber (212) and leaving metals or pollutants undissolved by the carbon dioxide in dissolution chamber (211).

According to a particular feature, the second containers (50, 50') or oxidation containers are loaded with a certain quantity of ashes containing pollutants or heavy metals mixed with a water-base mixture, the plant comprising means for bringing the pressure and temperature of this mixture above the triple point of water, or to the point where the water is in a supercritical state, in order to oxidize the heavy metals or degrade the other pollutants contained in these ashes.

According to a particular point, the water-pressurizing means comprises a flexible metal disk (500) closing oxidation container (50) and on which rests a pressure screw (502) screwed into a cover (501) and passing through this cover (501) screwed onto container (50) to clamp metal disk (500), oxidation container (50) being positioned inside a waste container (20) to be introduced into plant (1) comprising pyrolysis furnace (12), in order to obtain the supercritical state of the water and the hydrothermal reaction of the ashes.

According to a particular feature, the water-pressurizing means comprises a high-pressure pump that can be attached to a second part (50b) or a cold part of oxidation container (50') to pressurize the inside of this container, the inside of this container also comprising a first part (50a), or hot part, that can be kept under pressure by confinement means (52), while the pressure is relaxed in cold part (50b); hot part (50a) can then be heated by heating means (53) to obtain the conditions necessary for the passage of water to the supercritical state in said hot part (50a).

According to a particular feature, these oxidation containers (50, 50') are brought to a pressure greater than 221 bars and a temperature higher than 375° C.

According to a particular feature, energy recovery means (4) comprises an Ericsson-modified Stirling engine.

It should be clear to persons skilled in the art that the present invention permits embodiments in numerous other specific forms without deviating from the field of application of the invention as claimed. Consequently, the present embodiments must be considered by way of illustration, but can be modified within the field defined by the scope of the attached claims, and the invention must not be limited to the details given above.

What is claimed is:

1. A treatment method for industrial and/or household waste, characterized in that it notably comprises loading the waste into a plurality of pierced containers, pyrolysis of the waste in containers by conveyance into a pyrolysis furnace and one or more treatments of the products resulting from this pyrolysis, the pierced containers having at least one part with a shape permitting these containers to roll on themselves in the pyrolysis furnace, thus producing the movement and the turning of the containers by gravity of their contents;
   a drying of waste in containers before pyrolysis by conveyance into a dryer heated by the residual heat from the means used to heat the pyrolysis furnace;
   a recycling of a portion of the gases issued from the pyrolysis as a fuel, to obtain the heat necessary for pyrolysis or to supply at least an energy-recovery means, or both; and
   evacuating the pyrolysis gases into evacuation conduits whose temperature is particularly controlled by heating or cooling the conduits, so as to prevent the escape of polluting gases.

2. A treatment method for industrial and/or household waste, characterized in that it notably comprises loading the waste into a plurality of pierced containers, pyrolysis of the waste in containers by conveyance into a pyrolysis furnace and one or more treatments of the products resulting from this pyrolysis, the pierced containers having at least one part with a shape permitting these containers to roll on themselves in the pyrolysis furnace, thus producing the movement and the turning of the containers by gravity of their contents, further characterized in that the gases resulting from pyrolysis lose a part of the pollutants that they contain upon contact with filtering elements or absorbent elements containing activated charcoal, positioned after the gases leave this furnace, or both, filtering elements comprising motorization elements that contain activated charcoal and assure the rotation of waste containers by a rack system.

3. The method according to claim 2, further characterized in that after pyrolysis, it comprises a washing of the carbon-containing solids resulting from pyrolysis of the waste contained in containers, or of the activated charcoal of motorization elements, or both, this washing being carried out by passage into a liquid tank.

4. The method according to claim 2, further characterized in that it comprises a treatment of the dried carbon-containing solids resulting from the pyrolysis, or of activated charcoal after filtering of the pyrolysis gases, or both, this treatment comprising the following steps:
   crushing and possible sieving of the carbon-containing solids;

stirring, then flotation in a liquid tank of the crushed carbon-containing solids, so as to create a surface agglomeration of the carbon elements with a fatty element, on the one hand, and at the bottom of the tank, ashes containing heavy metals, on the other hand.

5. The method according to claim 2, further characterized in that activated charcoal contaminated by filtering of the pyrolysis gases, or carbon-containing solids resulting from pyrolysis, or a combination of these elements are treated according to a method of separation by supercritical gas comprising the following steps:

confinement of the elements to be treated in an extraction chamber containing a separation gas;

bringing to temperature and pressure of the extraction chamber in such a way that the separation gas changes into the supercritical state, bringing about an extraction of the charcoal present in the elements to be treated and a deposition in the form of ashes of the pollutants that it contains;

evacuation of the supercritical separation gas and the extracted charcoal that it contains outside the extraction chamber;

expansion of the separation gas at conditions below those for the supercritical state and deposition in solid form of the charcoal that it contains.

6. The method according to claim 5, further characterized in that the separation gas used comprises carbon dioxide, the extraction chamber being brought to a pressure greater than 73 bars and a temperature higher than 31° C.

7. The method according to claim 5, further characterized in that after flotation or separation by the super critical gas, the treatment of ashes containing the pollutants or the heavy metals comprises a hydrothermal treatment by a liquid in the supercritical state able to oxidize these metals or degrade these pollutants.

8. The method according to claim 7, further characterized in that the hydrothermal treatment of the ashes containing the pollutants or the heavy metals comprises the following steps:

mixture of the ashes to be treated with water in an oxidation container;

raising the contents of this oxidation container to a pressure above 221 bars and raising the temperature to above 374° C. so that the water passes to the super-critical state.

9. A treatment for industrial and/or household waste, characterized in that it notably comprises loading the waste into a plurality of pierced containers, pyrolysis of the waste in containers by conveyance into a pyrolysis furnace and one or more treatments of the products resulting from this pyrolysis, the pierced containers having at least one part with a shape permitting these containers to roll on themselves in the pyrolysis furnace, thus producing the movement and the turning of the containers by gravity of their contents, the method further comprising, after pyrolysis, a washing of the carbon-containing solids resulting from pyrolysis of the waste contained in containers, this washing being carried out by passage into a liquid tank.

10. A treatment method for industrial and/or household waste, characterized in that it notably comprises loading the waste into a plurality of pierced containers, pyrolysis of the waste in containers by conveyance into a pyrolysis furnace and one or more treatments of the products resulting from this pyrolysis, the pierced containers having at least one part with a shape permitting these containers to roll on themselves in the pyrolysis furnace, thus producing the movement and the turning of the containers by gravity of their contents, the method further including a treatment of waste after pyrolysis that comprises the following steps:

separation by gravity in a tank for separation of carbon-containing solids, on the one hand, and metals, minerals or metal oxides, on the other hand;

pumping of the carbon-containing solids into the separation tank;

filtering of these carbon-containing solids on a band filter to introduce the waster onto ion-exchange resins.

11. A plant for the treatment of industrial and/or household waste, characterized in that it comprises a pyrolysis furnace comprising means for conveying pierced containers containing waste to be treated, separation means to separate the products formed in containers by pyrolysis and treatment means for these separated products, the containers having at least one part with a shape permitting these containers to roll on themselves in the pyrolysis furnace, thus bringing about the movement and the turning of these containers by gravity of their contents, wherein a container receiving the waste is hollow and of rotating cylinder shape and comprises two toothed crown gears surrounding its axis and situated at both ends of container, and holes pierced in the base sections of container.

12. The plant according to claim 11, further characterized in that the pyrolysis furnace comprises a tunnel, at a reduced pressure by a pumping means, and through which containers containing the waste are conveyed, this tunnel comprising at each of its ends a part called the inlet lock and a part called the outlet lock able to receive at least one container between two doors endowed with sealing means and thus able to admit this container into the pyrolysis tunnel or to extract it from therein without placing in direct communication the inside of the tunnel with the outside atmosphere.

13. The plant according to claim 12, further characterized in that at least one door of at least one lock of the pyrolysis tunnel opens or closes according to a transverse translation movement at the axis of this tunnel, under the effect of at least one activator and can be sealed tight, one shut, by gaskets comprising at least one inflatable part able to be pressed against a part of this door.

14. The method according to claim 12, further characterized in that this temperature in the evacuation conduits is kept between 272° C. and 357° C.

15. The plant according to claim 13, further characterized in that the conveyance means for the pyrolysis furnace comprise a system of attached racks called rolling racks, with which end toothed crown gears of containers cooperate to hold and guide containers in movement.

16. The plant according to claim 15, further characterized in that at least a portion of rolling racks has a slope with regard to the ground of an angle greater than a given angle, this slope permitting facilitating or prolonging the rolling of containers in pyrolysis tunnel.

17. The plant according to claim 15, further characterized in that rolling racks comprise at least one part that moves by translation along the direction of rolling, or by rotation around a horizontal axis perpendicular to the direction of rolling, of a combination of these movements, this moving part being activated by mobilization means permitting displacing the moving part so as to either assure the continuity of rolling in a given region, or to increase the slope of the rack and trigger or maintain the rolling movement of at least one container, or both.

18. The plant according to claim 17, further characterized in that the conveyance means comprises a rack system comprising a plurality of motorization elements moved by activation means, placed above containers in a horizontal position and assuring the movement by rotation of containers by cooperating with a first toothed crown gear positioned on the outer surface of the containers around their axis.

19. The plant according to claim 11, further characterized in that the plant has filtering or absorption means for the pollutants contained in the gases from the pyrolysis, these filtering or absorption means comprising elements containing activated charcoal, positioned along the trajectory of these gases in the pyrolysis furnace, or in filtering means positioned after the gases leave this furnace, or both.

20. The plant according to claim 19, further characterized in that, in the pyrolysis furnace, the filtering or absorption means comprise activated charcoal, which is contained in motorization elements and interposed between the containers for waste, on one side, and conduits forming recovery means for the pyrolysis gases on the other side.

21. The plant according to claim 19, further characterized in that the plant comprises means for washing the waste contained in the conveyed containers or for washing the activated charcoal having filtered the pyrolysis gases, these washing means being situated downstream of the pyrolysis furnace and made up of a tank for washing by immersion.

22. The plant according to claim 11, further characterized in that the plant comprises means for recovery of the pyrolysis gases formed by pyrolysis of the waste in pierced containers, and either means for combustion of a portion of the pyrolysis gases to supply the pyrolysis furnace with heat, or means for recovery of a portion of the pyrolysis gases, whose combustion is used by the combustion means to supply an energy recovery means, or a combination of these elements.

23. The plant according to claim 11, further characterized in that it comprises a recovery means for the heat used by pyrolysis, these recovery means supplying a dryer designated to dry waste conveyed in containers by the conveyance means, this dryer being situated upstream of pyrolysis furnace and comprising means for recovery of the water vapor formed by drying of the waste, on the one hand, and means for evacuation of the heat, on the other.

24. The plant according to claim 23, further characterized in that tank, pyrolysis furnace and dryer are made up of three tunnels with hollow shells, respectively superimposed, in which containers are conveyed, the introduction of containers into dryer, the passage of the contents of dryer to pyrolysis furnace and the passage from pyrolysis furnace to tank being carried out in each of these positions by a cylinder positioned vertically along its axis of rotation and comprising a piston that moves by translation and by rotation in the cylinder along the axis of the cylinder, this piston being hollow and partially open on its surface facing the inner wall of the cylinder, the opening of the piston having dimensions so as to be able to receive a waste container at the outlet of a tunnel or during the introduction of a container in the plant and so that the solid part of the piston surface can tightly block the inlet or outlet of tunnels, so as to be able to create the vacuum necessary for pyrolysis reaction by means of a vacuum pump in the pyrolysis furnace.

25. The plant according to claim 21, further characterized in that after washing, the containers are emptied into a separation tank to separate the products contained in containers having undergone pyrolysis, a part of the products constituting carbon-containing solids being found on the containers having undergone pyrolysis, a part of the products constituting carbon-containing solids being found on the surface of tank and another part constituting metals or minerals being found at the bottom of tank on a conveyer belt lifting the minerals toward the outside of the tank to bring them toward a recovery station.

26. The plant according to claim 25, further characterized in that a pump, connected between the tank and a filter, pumps the carbon-containing solids to introduce them into a band filter pierced with small holes, a Venturi system creating a reduced pressure through the filter holes, so as to bring the water filled with salt of the carbon-containing solids onto ion-exchange resins.

27. A plant for treatment of industrial and/or household waste, characterized in that it comprises a pyrolysis furnace comprising means for conveying pierced containers containing waste to be treated, separation means to separate the products formed in containers by pyrolysis and treatment means for these separated products, the containers having at least one part with a shape permitting these containers to roll on themselves in the pyrolysis furnace, thus bringing about the movement and the turning of these containers by gravity of their contents, the plant further comprising at least one extraction chamber able to receive activated charcoal polluted by the filtering of pyrolysis gases, or carbon-containing solids from pyrolysis, or a combination of these elements, and is to be filled with a mixture based on carbon dioxide, and having pumping means able to bring the carbon dioxide in the chamber to its supercritical state, so as to extract the solid carbon present in the chamber, then to evacuate this supercritical carbon dioxide towards an expansion chamber and by leaving metals or pollutants unextracted by the carbon dioxide in the extraction chamber.

28. A plant for treatment of industrial and/or household waste, characterized in that it comprises a pyrolysis furnace comprising means for conveying pierced containers containing waste to be treated, separation means to separate the products formed in containers by pyrolysis and treatment means for these separated products, the containers having at least one part with a shape permitting these containers to roll on themselves in the pyrolysis furnace, thus bringing about the movement and the turning of these containers by gravity of their contents, wherein second containers or oxidation containers are loaded with a certain quantity of ashes containing pollutants or heavy metals mixed with a water-based mixture, the plant comprising means for bringing the pressure and temperature of this mixture above the triple point of water, or to the point where the water is in a supercritical state, in order to oxidize the heavy metals or degrade other pollutants contained in these ashes.

29. The plant according to claim 28, further characterized in that the water-pressurizing means comprises a flexible metal disk closing oxidation container and on which rests a pressure screw screwed into a cover and passing through this cover screwed onto container to clamp the metal disk, the oxidation container being positioned inside a waste container, so as to be introduced into the plant comprising a pyrolysis furnace, in order to obtain the supercritical state of the water and the hydrothermal reaction on the ashes.

30. The plant according to claim 28, further characterized in that the water pressurizing means comprises a high-pressure pump that can be attached to a second part or a cold part of the oxidation container to pressurize the inside of this container that also comprises a first part, or hot part, which can be kept under pressure by confinement means; while the pressure is relaxed in the cold part, the hot part can then be heated by heating means to obtain the conditions necessary for passage of the water to the supercritical state in the hot part.

31. The plant according to claim 28, further characterized in that these oxidation containers are brought to a pressure greater than 221 bars and a temperature higher than 375° C.

32. The plant according claim 22, further characterized in that energy recovery means comprises an Ericsson-modified Stirling engine.

* * * * *